(12) United States Patent
Nakamura et al.

(10) Patent No.: US 11,778,999 B2
(45) Date of Patent: Oct. 10, 2023

(54) FISHING REEL

(71) Applicant: Shimano Inc., Sakai (JP)

(72) Inventors: Kouhei Nakamura, Sakai (JP); Kunio Takechi, Sakai (JP)

(73) Assignee: Shimano Inc., Sakai (JP)

( * ) Notice: Subject to any disclaimer, the term of this patent is extended or adjusted under 35 U.S.C. 154(b) by 0 days.

(21) Appl. No.: 17/695,108

(22) Filed: Mar. 15, 2022

(65) Prior Publication Data

US 2022/0338456 A1 Oct. 27, 2022

(30) Foreign Application Priority Data

Apr. 22, 2021 (JP) ................. 2021-072515

(51) Int. Cl.
*A01K 89/01* (2006.01)
*A01K 89/033* (2006.01)

(52) U.S. Cl.
CPC .................... *A01K 89/05* (2015.05)

(58) Field of Classification Search
CPC ............ A01K 89/0186; A01K 89/0189; A01K 89/0191; A01K 89/01928; A01K 89/0193; A01K 89/05; A01K 89/057; A01K 89/058; A01K 89/059
See application file for complete search history.

(56) References Cited

U.S. PATENT DOCUMENTS

2022/0217959 A1* 7/2022 Ismail ............... A01K 89/0193

FOREIGN PATENT DOCUMENTS

| DE | 60124276 T2 | * | 5/2007 |
| EP | 2143329 A2 | * | 1/2010 |
| EP | 3005870 A1 | * | 4/2016 |
| EP | 3251504 B1 | * | 7/2021 |
| JP | 3534574 B2 | * | 6/2004 |
| JP | 6560903 B2 | | 8/2019 |

* cited by examiner

*Primary Examiner* — Emmanuel M Marcelo
(74) *Attorney, Agent, or Firm* — United IP Counselors, LLC

(57) ABSTRACT

A fishing reel includes a reel body, a first shaft member, a second shaft member, a rolling element, and an outer member. The first shaft member is rotatably supported by the reel body. The second shaft member is connected to an end of the first shaft member in an axial direction of the first shaft member. The second shaft member rotates integrally with the first shaft member. The rolling element contacts the second shaft member in a radial direction away from an axial center of the first shaft member. The outer member is disposed outside the rolling element in the radial direction. The outer member rotates integrally with the second shaft member only in one direction along a circumferential direction around the axial center of the first shaft member.

10 Claims, 4 Drawing Sheets

FISHING REEL

CROSS-REFERENCE TO RELATED APPLICATIONS

This application claims priority to Japanese Patent Application No. 2021-072515, filed Apr. 22, 2021. The contents of that application are incorporated by reference herein in their entirety.

TECHNICAL FIELD

The present invention relates to a fishing reel.

BACKGROUND ART

A fishing reel, such as the double bearing reel disclosed in Japanese Patent No. 6560903, has a reel body, a spool shaft, and a one-way clutch. The spool shaft is rotatably supported by the reel body.

The one-way clutch has a rolling element and an outer member. The rolling element contacts the spool shaft in the radial direction. The outer member acts as the outer ring of the rolling element. The outer member is placed outside the rolling element in the radial direction. The outer member rotates integrally with the spool shaft only in one direction in the circumferential direction.

BRIEF SUMMARY

In the configuration of the conventional art, the spool shaft is inserted into the rolling element of the one-way clutch. For example, when a seal member for the rolling element is placed in the configuration of the conventional art, the spool shaft is inserted inside the rolling element with the seal member placed axially adjacent to the rolling element. In this case, when the spool shaft is inserted into the rolling element, there is a possibility that the seal member will be rolled inside the rolling element. In other words, in the configuration of the conventional art, there is a risk that water from the spool shaft to the rolling element may enter the inside of the rolling element.

The object of the present invention is to provide a fishing reel configured to improve the waterproof performance of a sealing member.

A fishing reel according to an aspect of the present invention has a reel body, a first shaft member, a second shaft member, a rolling element, and an outer member. The first shaft member is rotatably supported by the reel body. The second shaft member is connected to an end of the first shaft member in an axial direction of the first shaft member. The second shaft member rotates integrally with the first shaft member.

The rolling element contacts the second shaft member in a radial direction away from an axial center of the first shaft member. The outer member is disposed outside the rolling element in the radial direction. The outer member rotates integrally with the second shaft member only in one direction along a circumferential direction around the axial center of the first shaft member.

In the fishing reel according to this aspect of the present invention, the second shaft member is inserted into a seal member and the second shaft member is connected to the first shaft member in a state where the second shaft member is inserted into the rolling element. This allows the seal member to be placed without being rolled inside the rolling element as in the configuration of the conventional art. Thus, this allows the seal member to properly stop water flowing from the first shaft member to the rolling element. In other words, the waterproof performance of the sealing member can be improved.

In a fishing reel according to another aspect of the present invention, it is preferred that the first shaft member has a recess formed at the end of the first shaft member. In this case, the second shaft member has a shaft body that contacts the rolling element, and an engagement portion disposed on the shaft body and configured to be engaged with the recess. In this configuration, the second shaft member is rotated integrally with the first shaft member by engaging the engagement portion of the second shaft member with the recess of the first shaft member.

The fishing reel according to another aspect of the present invention is preferably further equipped with a sealing member. In this case, the seal member contacts the second shaft member between the first shaft member and the rolling element in the axial direction where the axial center of the first shaft member extends. This configuration allows the seal member to suitably stop water from flowing from the first shaft member to the rolling element.

In a fishing reel according to another aspect of the present invention, it is preferred that the second shaft member has a small diameter portion. In this case, the small diameter portion is provided between the shaft body and the engagement portion. The small diameter portion has a smaller diameter than the shaft body. A tip of the seal member contacts the small diameter portion. In this configuration, since the tip of the seal member contacts the small-diameter portion, the seal member can more preferably stop water flowing from the first shaft member to the rolling element.

In a fishing reel according to another aspect of the invention, it is preferred that the first shaft member is a spool shaft. In this case, the outer member receives a frictional force from a member whose rotation is restricted with respect to the reel body. In this configuration, the first shaft member is the spool shaft, and the second shaft member is connected to the spool shaft. In this case, water flowing from the spool shaft to the rolling element can be appropriately stopped by the seal member.

According to the present invention, the waterproof performance of a sealing member can be improved in a fishing reel.

DETAILED DESCRIPTION

Figure 1:
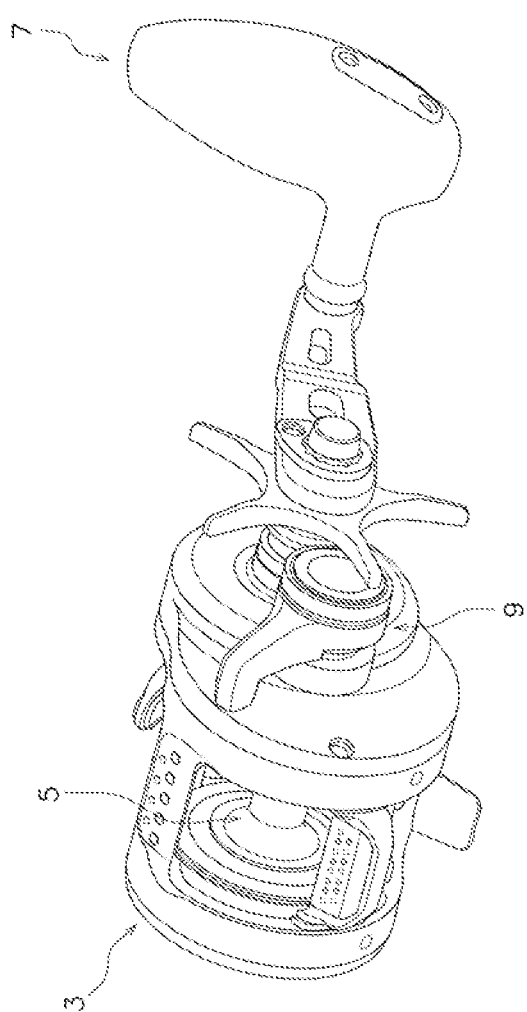
FIG. 1 is a perspective view of a double bearing reel.
Figure 2:
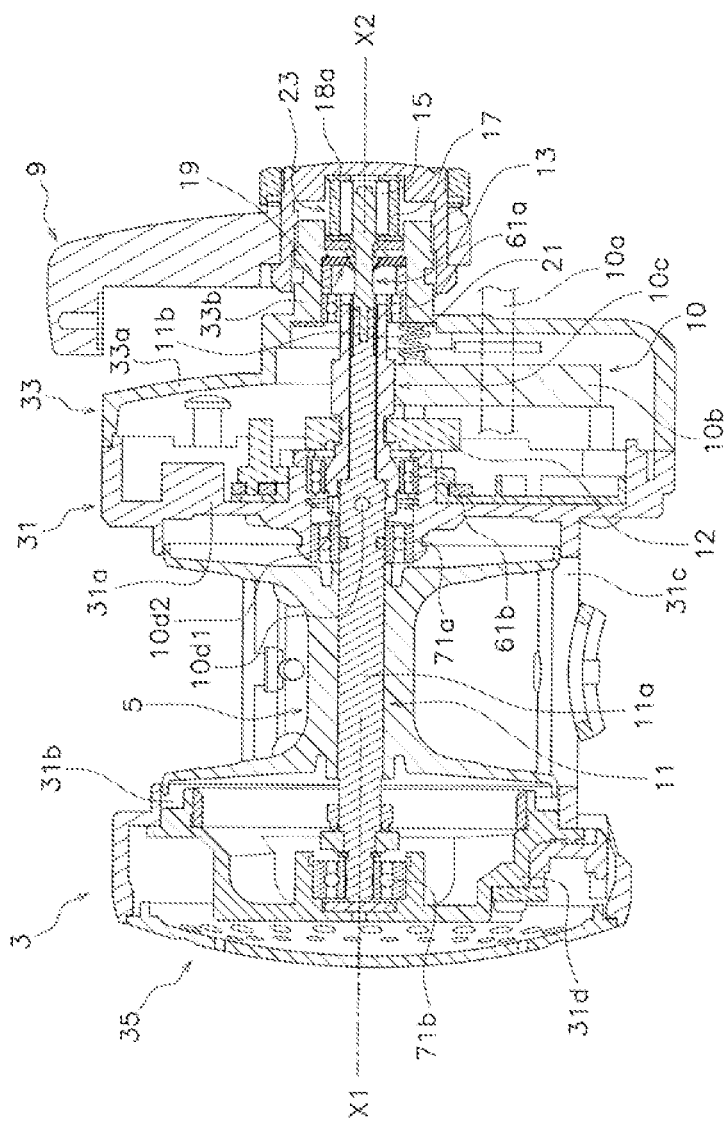
FIG. 2 is a cross-sectional view of the double bearing reel.

The following is a description of an embodiment of a double bearing reel 1 (an example of the fishing reel) in accordance with the present invention with reference to the drawings. As shown in FIG. 1, the double bearing reel 1 has a reel body 3, a spool 5, a handle 7, and an operation lever 9. As shown in FIG. 2, the double bearing reel 1 is further equipped with a spool shaft 11, a connecting shaft 13 (an example of the second shaft member), a rolling element 15, an outer member 17, and a seal member 19. The double bearing reel 1 further has a cylindrical member 21. In this embodiment, the rolling element 15 and the outer member 17 constitute a one-way clutch 23.

An axial direction is the direction in which a first axial center X1 (an example of the axial center) of the spool shaft 11 (an example of the first shaft member), to be described later, extends. A radial direction is the direction that is perpendicular to the first axial center X1 of the spool shaft 11 and extends away from the first axial center X1 of the spool shaft 11. A circumferential direction is the direction around the first axial center X1 of the spool shaft 11.

As shown in FIG. 2, the reel body 3 has a frame 31, a first side cover 33, and a second side cover 35. The frame 31 has a first side plate 31a, a second side plate 31b, and a plurality of connecting portions 31c. The first side plate 31a and the second side plate 31b are spaced apart from each other in the axial direction. The first side plate 31a and the second side plate 31b are connected to each other via the plurality of connecting portions 31c. The first side plate 31a, the second side plate 31b, and the plurality of connecting portions 31c are formed integrally.

The first side cover 33 covers the first side plate 31a. For example, the first side cover 33 has a cover body 33a and a protruding portion 33b. The cover body 33a covers the first side plate 31a between the handle 7 and the first side plate 31a. The protruding portion 33b protrudes axially outward from the cover body 33a. The protruding portion 33b is formed in a cylindrical shape. The protruding portion 33b connects the inner space of the first side cover 33 and the first side plate 31a to the outer space. The second side cover 35 covers the second side plate 31b. In more detail, the second side cover 35 covers the second side plate 31b on the side opposite to the handle 7.

As shown in FIG. 2, the spool 5 is rotatably supported by the reel body 3. For example, the spool 5 is mounted on the spool shaft 11 so that the spool 5 rotates integrally with the spool shaft 11. The spool 5 is rotatably supported by the reel body 3 via the spool shaft 11.

The handle 7 shown in FIG. 1 is a member for rotating the spool shaft 11. The handle 7 is attached to the reel body 3. For example, the handle 7 is rotatably supported on the reel body 3 via a drive shaft 10a shown in FIG. 2. For example, when the handle 7 and the drive shaft 10a rotate, the spool shaft 11 and the spool 5 rotate via a rotation transmission mechanism 10.

As shown in FIG. 2, the rotation transmission mechanism 10 is placed in the inner space of the first side cover 33 and the first side plate 31a. The rotation transmission mechanism 10 transmits the rotation of the handle 7 to the spool shaft 11. The rotation transmission mechanism 10 has the drive shaft 10a, a drive gear 10b, and a pinion gear 10c.

The drive shaft 10a is rotatably supported by the first side plate 31a and the first side cover 33. The drive shaft 10a rotates integrally with the handle 7. The drive gear 10b rotates integrally with the drive shaft 10a.

The pinion gear 10c is rotatably supported by the first side plate 31a and the first side cover 33 via a plurality of bearings 61a, 61b. The pinion gear 10c meshes with the drive gear 10b. The pinion gear 10c is formed in a cylindrical shape. The spool shaft 11 is inserted into the inner circumference of the pinion gear 10c.

The pinion gear 10c is guided axially along the spool shaft 11 by a clutch yoke 12. The rotation from the pinion gear 10c to the spool shaft 11 is transmitted by engagement of an engagement pin 10d1 of the spool shaft 11 with an engagement recess 10d2 of the pinion gear 10c. When the engagement pin 10d1 and the engagement recess 10d2 are disengaged, the rotation of the pinion gear 10c is not transmitted to the spool shaft 11.

As shown in FIGS. 1 and 2, the operation lever 9 is attached to the reel body 3. For example, as shown in FIG. 2. As shown in FIG. 2, the operation lever 9 is mounted on the protruding portion 33b of the first side cover 33. In more detail, the operation lever 9 is attached to the protruding portion 33b in a swingable manner. The swing movement of the operation lever 9 presses the outer member 17 in the axial direction. For example, the outer member 17 is pressed in the axial direction through a first friction plate 18a by the swing movement of the operation lever 9.

The spool shaft 11 rotates integrally with the spool 5. As shown in FIG. 2, the spool shaft 11 is rotatably supported by the reel body 3. For example, the spool shaft 11 is rotatably supported by the reel body 3 through a plurality of bearings 71a, 71b.

Figure 3:
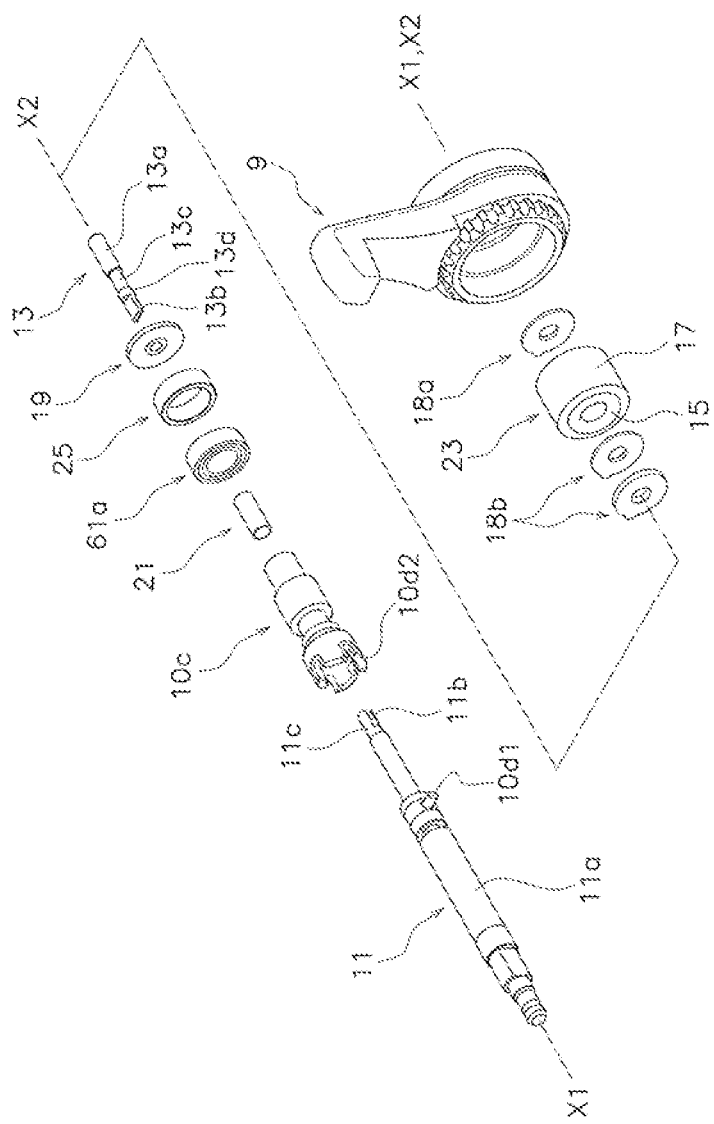
FIG. 3 is an exploded view of a spool shaft and a connecting shaft, and the peripheral members of the spool shaft and the connecting shaft.
Figure 4:
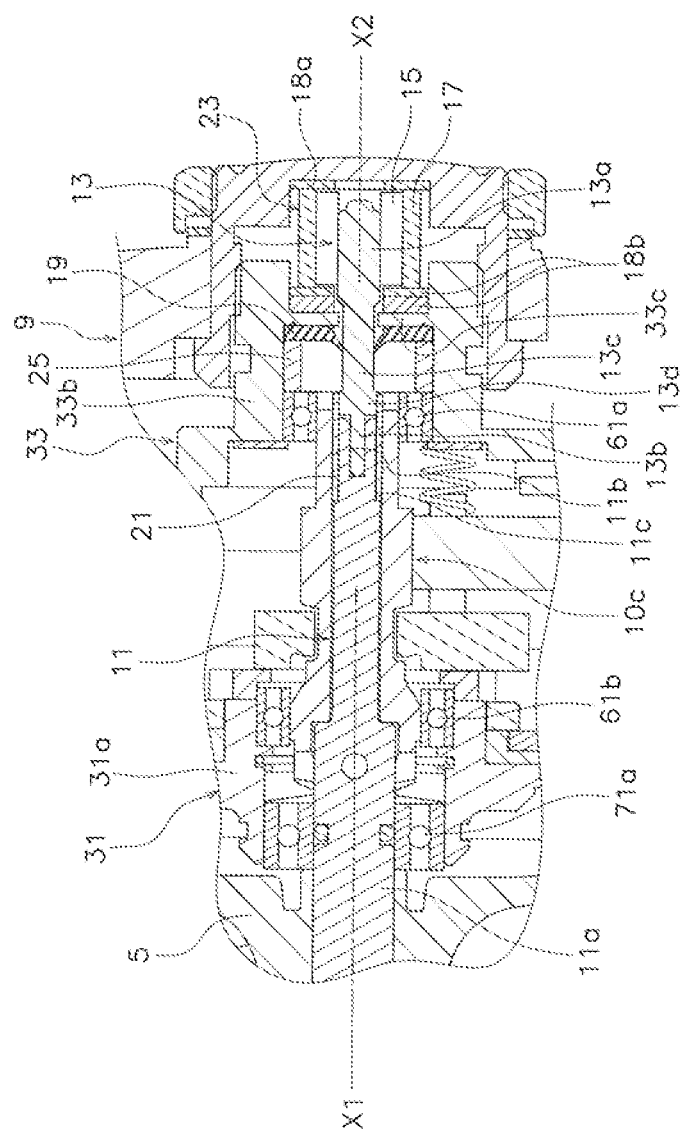
FIG. 4 is a partially enlarged cross-sectional view of the double bearing reel.

As shown in FIG. 2, FIG. 3, and FIG. 4, the spool shaft 11 has a first shaft body 11a and a recess 11b. The first shaft body 11a has a first axial center X1.

As shown in FIG. 2, the spool 5 is mounted on the first shaft body 11a so that the spool 5 rotates integrally with the first shaft body 11a. The central part of the first shaft body 11a is rotatably supported by the first side plate 31a through the bearing 71a. An end of the first shaft body 11a, located on the opposite side of the handle 7, is rotatably supported by a bearing member 31d via the bearing 71b. The bearing member 31d is mounted on the second side plate 31b.

As shown in FIGS. 2 and 4, the first shaft body 11a is inserted into the inner circumference of the pinion gear 10c. For example, a part of the first shaft body 11a on the handle 7 side is inserted into the pinion gear 10c.

As shown in FIG. 4, the other end of the first shaft body 11a on the handle 7 side is provided with an annular step 11c. The step 11c is spaced apart from the inner peripheral surface of the pinion gear 10c in the radial direction. The cylindrical member 21 is placed in the step 11c.

As shown in FIG. 2, FIG. 3, and FIG. 4, the recess 11b is formed at an end of the spool shaft 11. For example, the recess 11b is formed at an end of the first shaft body 11a on the handle 7 side. The recess 11b is a groove that extends in the radial direction.

The connecting shaft 13 rotates integrally with the spool shaft 11. As shown in FIGS. 2 and 4, the connecting shaft 13 is connected to the spool shaft 11. For example, the connecting shaft 13 is connected to the end of the shaft body 11a on the handle 7 side in the axial direction.

As shown in FIGS. 3 and 4, the connecting shaft 13 has a second shaft body 13a (an example of the shaft body), an engagement portion 13b, and a small diameter portion 13c. The connecting shaft 13 further has an annular portion 13d. As shown in FIG. 4, the second shaft body 13a is disposed inside the rolling element 15 in the radial direction. The second shaft body 13a contacts the rolling element 15.

For example, as shown in FIGS. 3 and 4, the second shaft body 13a is formed in a cylindrical shape. The second shaft body 13a has a second axial center X2. As shown in FIG. 4, in a state where the connecting shaft 13 is connected to the spool shaft 11, the second axial center X2 is arranged concentrically with the first axial center X1 of the spool shaft 11.

As shown in FIGS. 3 and 4, the engagement portion 13b is provided on the second shaft body 13a. For example, the engagement portion 13b is provided on the second shaft body 13a via the small diameter portion 13c. As shown in FIG. 4, the engagement portion 13b engages with the recess 11b of the spool shaft 11. For example, the engagement portion 13b engages with the recess 11b located at the end of the first shaft body 11a on the handle 7 side.

As shown in FIG. 3, the cross section of the engagement portion 13b is formed in a non-circular shape such as a rectangular shape. By engaging the rectangular-shaped engagement portion 13b and the groove-shaped recess 11b with each other, the second shaft body 13a of the connecting shaft 13 rotates integrally with the first shaft body 11a of the spool shaft 11.

As shown in FIGS. 3 and 4, the small diameter portion 13c is provided between the second shaft body 13a and the engagement portion 13b. In more detail, the small diameter portion 13c is provided between the second shaft body 13a and the annular portion 13d. The small diameter portion 13c is formed in the shape of a cylinder. The outer diameter of the small diameter portion 13c is smaller than the outer diameter of the second shaft body 13a. The annular portion 13d is provided between the engagement portion 13b and the small diameter portion 13c. The outer diameter of the annular portion 13d is larger than the outer diameter of the small part 13c.

The cylindrical member 21 restricts the engagement portion 13b of the connecting shaft 13 from moving in the radial direction within the recess 11b of the spool shaft 11. As shown in FIG. 4, the cylindrical member 21 is placed, in the radial direction, between the end of the spool shaft 11 on the handle 7 side and the pinion gear 10c. For example, the cylindrical member 21 is disposed between the step 11c of the first shaft body 11a and the inner peripheral surface of the pinion gear 10c in the radial direction. In a state where the recess 11b of the spool shaft 11 and the engagement portion 13b of the connecting shaft 13 are engaged, an end of the cylindrical member 21 is placed on the outer peripheral surface of the annular portion 13d of the connecting shaft 13.

As shown in FIGS. 2 and 4, the one-way clutch 23 is mounted on the connecting shaft 13. The one-way clutch 23 is disposed between the connecting shaft 13 and the protruding portion 33b of the first side cover 33 in the radial direction away from the second axial center X2 of the connecting shaft 13.

As shown in FIG. 2, FIG. 3, and FIG. 4, the one-way clutch 23 has the rolling element 15 and the outer member 17. As shown in FIGS. 2 and 4, the rolling element 15 is placed between the connecting shaft 13 and the outer member 17. For example, as shown in FIG. 4, the rolling element 15 is placed between the second shaft body 13a of the connecting shaft 13 and the outer member 17.

The rolling element 15 contacts the connecting shaft 13 in the radial direction. For example, in a state where the connecting shaft 13 is connected to the spool shaft 11, the rolling element 15 contacts the second shaft body 13a of the connecting shaft 13 in the radial direction away from the first axial center X1 of the spool shaft 11. In a state where the connecting shaft 13 is not connected to the spool shaft 11, the rolling element 15 contacts the second shaft body 13a of the connecting shaft 13 in the radial direction away from the second axial center X2 of the connecting shaft 13.

In a state where the rolling element 15 is in contact with the connecting shaft 13, when the connecting shaft 13 rotates in the fishing-line winding direction, the rolling element 15 rotates with respect to the outer member 17. In other words, in this case, the rolling element 15 does not transmit the rotation of the connecting shaft 13 in the fishing-line winding direction to the outer member 17. On the other hand, when the connecting shaft 13 rotates in the fishing-line feeding direction, the rolling element 15 transmits the rotation of the connecting shaft 13 in the fishing-line feeding direction to the outer member 17.

The outer member 17 is configured to be rotatable with the connecting shaft 13 in only one direction in the circumferential direction. For example, when the connecting shaft 13 rotates with the spool shaft 11 in the fishing-line feeding direction, the rolling element 15 transmits the rotation in the fishing-line feeding direction to the outer member 17. In other words, the outer member 17 rotates integrally with the connecting shaft 13 only in the fishing-line feeding direction. Therefore, in this embodiment, the above "one direction" corresponds to the "fishing-line feeding direction."

As shown in FIGS. 2 and 4, the outer member 17 is located outside the rolling element 15 in the radial direction. The outer member 17 is rotatable with respect to the reel body 3. For example, the outer member 17 is rotatable with respect to the protruding portion 33b of the first side cover 33.

The outer member 17 receives a frictional force from a member whose rotation is restricted to the reel body 3. For example, as shown in FIGS. 3 and 4, the outer member 17 is sandwiched in the axial direction by the first friction plate 18a and the second friction plate 18b. In other words, the rotation of the outer member 17 is braked by the first friction plate 18a and the second friction plate 18b.

The first friction plate 18a is mounted non-rotatably to the operation lever 9. The first friction plate 18a is located between the outer member 17 and the operation lever 9 in the axial direction. The first friction plate 18a is an annular plate member. The first friction plate 18a contacts the outer member 17 and the operation lever 9 in the axial direction. The first friction plate 18a does not contact the rolling element 15.

The second friction plate 18b is mounted non-rotatably to the protruding portion 33b of the first side cover 33. For example, a plurality (e.g., two) of second friction plates 18b are disposed, in the axial direction, between the outer member 17 and the seal member 19. In more detail, the plurality of second friction plates 18b are disposed, in the axial direction, between the outer member 17 and a flange 33c provided on the inner circumference of the protruding portion 33b.

Each of the plurality of second friction plates 18b is an annular plate member. One of the second friction plates 18b is in contact with the outer member 17 in the axial direction, and is not in contact with the rolling elements 15. The other one of second friction plates 18b is in contact with the flange 33c of the protruding portion 33b in the axial direction.

As shown in FIG. 4, the seal member 19 is placed between the spool shaft 11 and the rolling element 15 in the axial direction. In this state, the seal member 19 contacts the connecting shaft 13.

As shown in FIG. 3, the seal member 19 is formed in an annular shape. The outer periphery of the seal member 19 is disposed between the spool shaft 11 and the outer member 17 in the axial direction. For example, the outer circumference of the seal member 19 contacts the flange 33c of the protruding portion 33b in the axial direction. The tip of the seal member 19 is placed between the spool shaft 11 and the rolling element 15 in the axial direction. In this state, the tip of the seal member 19, for example, the inner circumference of the seal member 19, contacts the small diameter portion 13c of the connecting shaft 13.

As shown in FIGS. 3 and 4, a positioning member 25 is placed between the seal member 19 and the bearing 61a. For example, the positioning member 25 is formed in a cylindrical shape. The positioning member 25 contacts the outer periphery of the seal member 19 and the outer ring of the bearing 61a in the axial direction. This positioning member 25 restricts the seal member 19 from moving in the axial direction.

In the double bearing reel 1 with the above configurations, the connecting shaft 13 is first inserted into the rolling element 15 of the one-way clutch 23. In this manner, the one-way clutch 23 and the connecting shaft 13 are configured as one unit.

In this state, the connecting shaft 13 is inserted into the seal member 19 which is located in the protruding portion 33b of the first side cover 33, and the connecting shaft 13 is connected to the spool shaft 11. This allows the seal member 19 to be placed without the seal member 19 being rolled inside the rolling element 15 as in the configuration of the conventional art. Accordingly, this allows the seal member 19 to suitably stop water from the spool shaft 11 to the rolling element 15. In other words, the waterproof performance of the seal member 19 can be improved.

By engaging the engagement portion 13b of the connecting shaft 13 with the recess 11b of the spool shaft 11, the connecting shaft 13 can be rotated integrally with the spool shaft 11.

In addition, the seal member 19 is placed between the spool shaft 11 and the rolling element 15 in the axial direction, and the seal member 19 contacts the connecting shaft 13. Thus, the seal member 19 can suitably stop water flowing from the spool shaft 11 to the rolling element 15.

Also, since the tip of the seal member 19 contacts the small-diameter portion 13c of the connecting shaft 13, the seal member 19 can more appropriately stop water flowing from the spool shaft 11 to the rolling element 15.

Even if the outer member 17 is configured to receive a frictional force from the first and second friction plates 18a and 18b, the connecting shaft 13 can be inserted into the seal member 19 and connected to the spool shaft 11. In other words, even with this configuration, the seal member 19 can suitably stop water flowing from the spool shaft 11 to the rolling element 15.

REFERENCE SIGNS LIST

1 Double bearing reel
3 Reel body
5 Spool
9 Operation lever
11 Spool shaft
11b Recess
13 Connecting shaft
13b Engagement portion
15 Rollers
17 Outer member
19 Seal member
23 One-way clutch
18a First friction plate
18b Second friction plate
X1 First axial center
X2 Second axial center

What is claimed is:

1. A fishing reel, comprising:
  a reel body;
  a first shaft member rotatably supported by the reel body;
  a second shaft member connected to an end of the first shaft member in an axial direction of the first shaft member, the second shaft member configured to rotate integrally with the first shaft member;
  a rolling element configured to contact the second shaft member in a radial direction away from an axial center of the first shaft member; and
  an outer member disposed outside the rolling element in the radial direction, the outer member configured to rotate integrally with the second shaft member only in one direction along a circumferential direction around the axial center of the first shaft member;
  wherein the first shaft member has a recess formed at the end thereof, and
  the second shaft member has a shaft body in contact with the rolling element and an engagement portion disposed on the shaft body, the engagement portion configured to be engaged with the recess.

2. The fishing reel according to claim 1, further comprising:
  a sealing member disposed between the first shaft member and the rolling element in the axial direction, the sealing member contacting the second shaft member.

3. The fishing reel according to claim 2, wherein
  the second shaft member has a small diameter portion disposed between the shaft body and the engagement part, the small diameter portion having a smaller diameter than the shaft body, and
  a tip of the seal member contacts the small diameter portion.

4. The fishing reel according to claim 1, wherein
  the first shaft member is a spool shaft, and
  the outer member receives a frictional force from a member whose rotation is restricted with respect to the reel body.

5. The fishing reel according to claim 1, further comprising:
  a sealing member contacting the second shaft member; and
  a positioning member configured to restrict movement of the sealing member in the axial direction.

6. A fishing reel, comprising:
  a reel body;
  a spool shaft rotatably supported by the reel body;
  a connecting shaft connected to an end of the spool shaft in an axial direction of the spool shaft, the connecting shaft configured to rotate integrally with the spool shaft;
  a one-way clutch configured to contact the connecting shaft; and
  a sealing member positioned between the spool shaft and the one-way clutch, the sealing member contacting the connecting shaft;
  wherein the connecting shaft includes an engagement portion shaped to engage a recess at the end of the spool shaft.

7. The fishing reel according to claim 6, further comprising:
  a positioning member configured to restrict movement of the sealing member in the axial direction.

8. The fishing reel according to claim 7, further comprising:
  a bearing positioned about at least one of the spool shaft or the connecting shaft member, wherein
  the positioning member is positioned between the bearing and the sealing member.

9. The fishing reel according to claim 6, wherein
  the connecting shaft includes a large diameter portion adapted to contact the one-way clutch and a small diameter portion adapted to receive the sealing member.

10. The fishing reel according to claim 6, further comprising:
 a member positioned around the spool shaft and the connecting shaft and adapted to restrict movement of the engagement portion in a radial direction.

\* \* \* \* \*